United States Patent [19]

Puyplat

[11] 4,092,528
[45] May 30, 1978

[54] ACCESSORY HEADLAMP MOUNTINGS

[75] Inventor: Olivier Puyplat, Paris, France

[73] Assignee: Cibie Projecteurs, Bobigny, France

[21] Appl. No.: 694,111

[22] Filed: Jun. 8, 1976

[30] Foreign Application Priority Data

Jun. 18, 1975 France .............................. 75 19084

[51] Int. Cl.² .............................................. B60Q 1/00
[52] U.S. Cl. .................................... 362/427; 362/430; 362/432
[58] Field of Search ...................... 240/41 R, 41.6, 44, 240/44.2, 61, 61.05, 61.2, 61.6, 61.7, 61.8, 57, 73 BJ; 403/79, 84, 91, 100

[56] References Cited

U.S. PATENT DOCUMENTS 3,032,649  5/1962  Radford .............................. 240/41.6

FOREIGN PATENT DOCUMENTS 1,032,942  6/1966  United Kingdom .................. 403/84

Primary Examiner—Russell E. Adams
Attorney, Agent, or Firm—Alan H. Levine

[57] ABSTRACT

A mounting arrangement for an accessory headlamp which allows the azimuthal direction of the headlamp beam to be adjusted and locked independently of the inclination of the beam. The mounting comprises a mounting bolt having larger and smaller diameter threaded portions separated by a shoulder. The smaller diameter portion passes through a mounting hole in the vehicle body and is secured by a nut, with the shoulder in contact with the body surface. The larger diameter portion receives a nut forming part of a clamping mechanism for the headlamp, which is pivoted to the top of the mounting bolt but can be locked by the clamping mechanism. In a modification, the larger diameter nut is replaced by a cam mechanism.

5 Claims, 4 Drawing Figures

ACCESSORY HEADLAMP MOUNTINGS

BACKGROUND OF THE INVENTION

1. Field of the Invention

This invention relates to an arrangement for mounting an accessory headlamp on a support such as the body of a motor vehicle.

2. Description of Prior Art

It is desirable that the direction of the beam of an accessory headlamp should be adjustable, both in inclination and in azimuthal direction (i.e., direction as seen in plan).

Various arrangements have been proposed which allow the headlamp to be positioned with its beam correctly directed, and then clamped in this position by tightening a single clamping device. One such arrangement comprises a mounting bolt which is pivotally connected at its upper end to the headlamp, and at its lower end passes through a hole in the vehicle body and is secured by a nut. A thrust collar is provided which surrounds the bolt, and abuts at one end against the vehicle body and at the other end supports the headlamp. Thus tension in the bolt is borne by the pivotal connection and by the contact between the headlamp and the thrust collar, so that tightening of the nut will lock the headlamp against both movements about the pivotal connection and movements about the axis of the mounting bolt. However, the adjustment of such arrangements is not completely straightforward because of the difficulty of obtaining the correct inclination and azimuthal settings simultaneously, without either setting being clamped, and then tightening the mounting bolt without upsetting either of the settings.

It is an object of the present invention to provide a headlamp mounting arrangement which is simple in construction, and can easily be adjusted in inclination without upsetting the azimuthal adjustment, or vice versa.

SUMMARY OF THE INVENTION

According to the present invention, an accessory headlamp mounting arrangement comprising: an elongate mounting element having, adjacent one end, a threaded portion; a threaded fastener for co-operation with the threaded portion to secure the elongate mounting element to a vehicle body while allowing adjustment of the azimuthal direction of the beam of the headlamp; a pivotal connection between the other end of the elongate mounting element and the headlamp, the pivotal connection allowing adjustment of the inclination of the beam of the headlamp; and a locking device associated with the pivotal connection for locking the pivotal connection by exerting thereon a clamping force directed lengthways of the elongate mounting element, incorporates the improvement comprising: an abutment on the elongate mounting element for transferring to the vehicle body the reaction force generated by tightening the threaded fastener, without the reaction force affecting the locking device; and a clamping mechanism associated with the locking device, the clamping mechanism being operable independently of the threaded fastener, for generating the clamping force, whereby the inclination of the beam of the headlamp may be adjusted without releasing the threaded fastener and thereby freeing the headlamp for changes in the azimuthal direction of its beam.

Preferably the threaded portion on the elongate mounting element has a male thread, and the abutment on the elongate mounting element is formed by an annular shoulder, from the central area of which the threaded portion projects.

In a preferred arrangement, the locking device comprises a thrust collar surrounding the elongate mounting element and engaging part of the headlamp, and a thrust device for urging the thrust collar towards the other end of the elongate mounting element for exerting the clamping force on the pivotal connection. For example, the elongate mounting element has a further threaded portion between the abutment and the other end thereof, and the thrust device comprises a nut screwed on the further threaded portion. Alternatively, the thrust device may comprise a cam which is rotatable about the elongate mounting element.

DESCRIPTION OF THE DRAWINGS

These and other features of the invention will become clear from the following description, taken in conjunction with the accompanying drawings, in which.

DESCRIPTION OF THE PREFERRED EMBODIMENT

Figure 1:
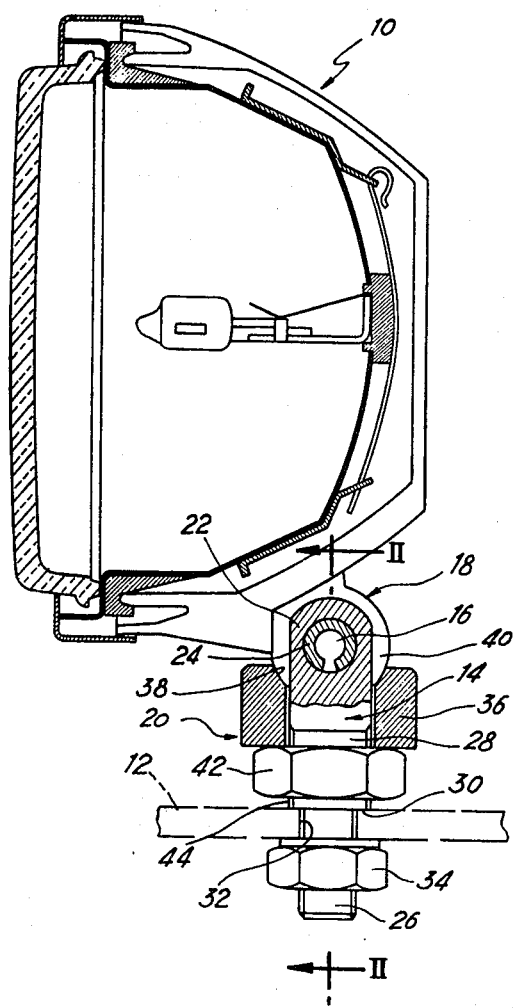
FIG. 1 is a sectional view of an accessory headlamp and its mounting.

The accessory headlamp is shown at 10 in FIG. 1, and is mounted on a support 12, which in this example is part of the bodywork of a motor vehicle. The means by which the headlamp is mounted comprises a bolt 14 which is fixed to the support 12, and to the top end of which a bracket 18 carrying the body of the headlamp 10 is connected.

As can be seen from the drawings, the bolt 14 has two screw-threaded parts 26 and 44 of different diameter, and a shoulder 30 between the two parts. The smaller diameter part 26 passes through a hole 32 in the support 12, and receives a nut 34 by which the bolt 14 is held in the hole 32. Thus the bolt 14, and with it the headlamp 10, can be angularly adjusted about a vertical axis while the nut 34 is loose; the nut 34 is then tightened.

The top end 22 of the bolt 14 is articulated at 16 to the connecting bracket 18 so as to allow pivoting of the bracket 18 and the headlamp 10 about a horizontal axis. The bracket 18 is in the form of a fork, between the arms of which the top end 22 of the bolt 14 lies. A pin 24, in this case a roll pin, passes through the arms 40 of the fork and through the top end of the bolt 14 to provide a pivot 16 having a horizontal axis. The pivot 16 can be locked, after adjusting the headlamp 10 to the required inclination, by tightening a nut 42 on the larger-diameter threaded part 44 of the bolt 14. (It will be seen that there is a clearance between the bottom of the nut 42 and the support 12, so that the nut 42 can be slackened and tightened without disturbing the adjustment of the headlamp about a vertical axis.) The upward force exerted by the nut 42 on tightening is transmitted through an annular abutment member 36 to the bracket 18. The top surface of the abutment member 36 is provided with a part-cylindrical recess 38 which receives the two correspondingly shaped arms 40 of the bracket 18. Thus, on tightening the nut, friction between the recess 38 and the arms 40, and to a lesser extent friction in the pivot 16, prevent the headlamp 10 from moving about a horizontal axis.

In a variant, the arms 40 and the cup 38 have ribs or similar raised portions extending parallel to the pin 24 to further improve the holding of the headlamp 10 in an angular position.

Figure 2:
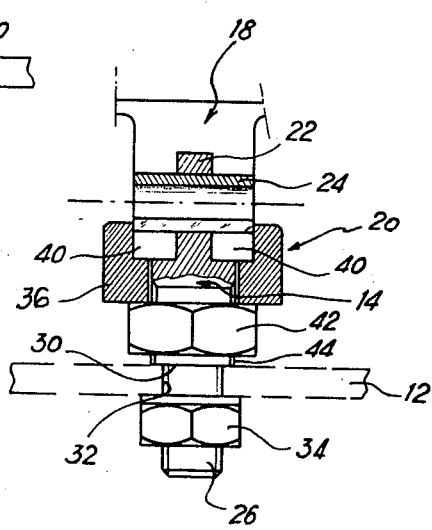
FIG. 2 is a section on the line II—II in FIG. 1.
Figure 3:
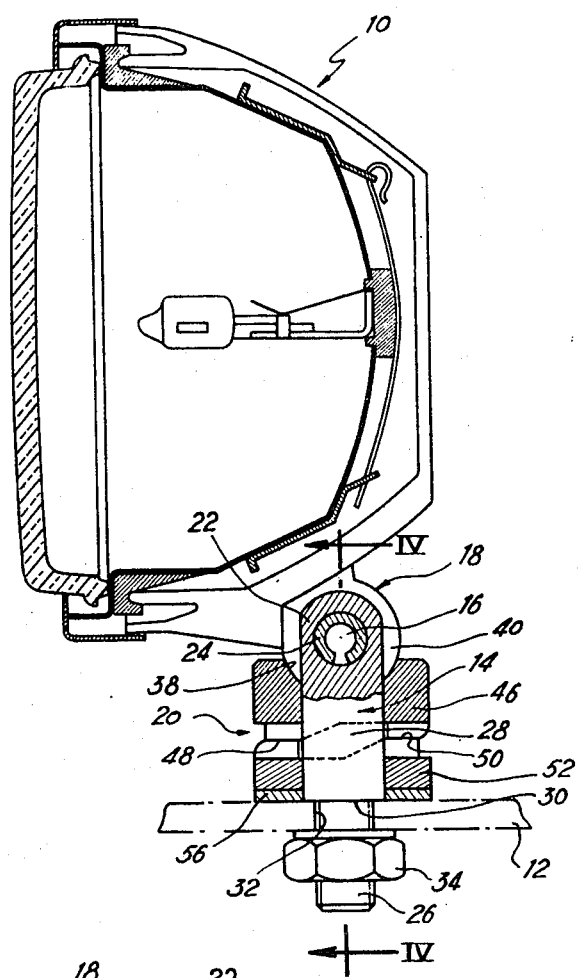
FIG. 3 is a similar section to FIG. 1 showing a second embodiment of the invention.
Figure 4:
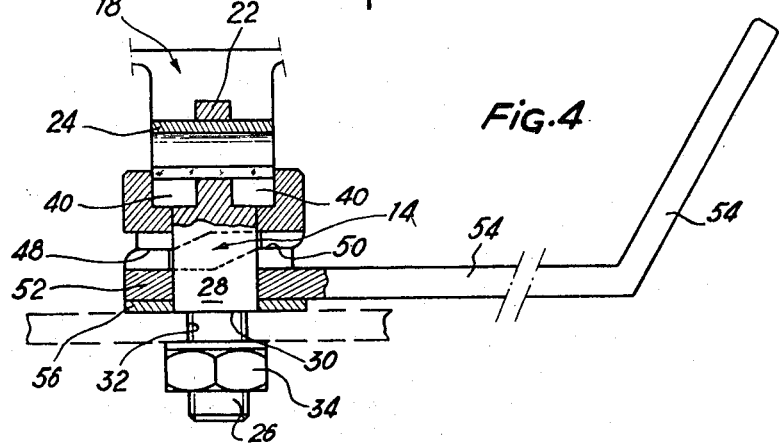
FIG. 4 is a section on the line IV—IV in FIG. 3.

The embodiment shown in FIGS. 3 and 4 is broadly similar to that shown in FIGS. 1 and 2, and the same reference numerals will be used to denote corresponding parts. The only differences from the embodiment already described concern the locking arrangement by which the headlamp is prevented from pivoting about the pin 24. In the embodiment shown in FIGS. 3 and 4, the locking arrangement again comprises an abutment member 46 similar to the above-described member 36; locking of the pivot 16 is achieved by subjecting the member 46 to an upward force, which is generated by two co-operating cam surfaces 48 and 50 one of which is formed on the bottom surface of the element 46 and the other on an annular cam element 52 disposed about the body 28 of the bolt 14. The cam element 52 may advantageously be provided with a lever arm 54 by which it can be rotated. An annular spacer 56 is interposed between the support 12 and the cam element 52 to ensure that the required thrust is exerted on the abutment element 46 when the cam element 52 is rotated to its maximum lift position.

With the two fixing and adjustment systems described above, it will be seen that adjustment of the orientation of the headlamp 10 is effected in two separate stages. In one of these stages, the orientation in the horizontal plane (direction) of the optical axis of the headlamp is adjusted and then fixed by means of the nut 34. In the other stage, the orientation in the vertical plane (inclination) of the optical axis is adjusted and then fixed by means of the nut 42 or the lever 54.

What I claim as my invention and desire to secure by Letters Patent is:

1. An accessory headlamp arrangement comprising:
   (a) an accessory headlamp,
   (b) an elongate mounting element having a body and a stem at one end of said body, said stem and body both being externally threaded,
   (c) an abutment between said threaded stem and the body of said mounting element, said abutment being of larger diameter than the diameter of said stem,
   (d) a pivot connection between said headlamp and the end of said mounting element opposite said stem for permitting infinite variation of the inclination of said headlamp beam,
   (e) a first nut threadably mounted on said stem, said first nut when tightened clamping a portion of a vehicle body between itself and said abutment after the azimuthal direction of said headlamp beam has been adjusted, and
   (f) locking means including a second nut carried by and movable lengthwise of said mounting element body, independently of said first nut, for locking said pivot connection in any selected one of an infinite number of positions of inclination of said headlamp, whereby the inclination of said headlamp bean can be adjusted without releasing the first nut and hence without disturbing the azimuthal adjustment of said headlamp.

2. An accessory headlamp arrangement as defined in claim 1 wherein said mounting element body has a diameter larger than said stem, said abutment being an annular shoulder formed where said stem and body meet.

3. An accessory headlamp arrangement as defined in claim 1 wherein said locking means includes a thrust collar surrounding said body between said pivot connection and said second nut, said thrust collar being frictionally pressed against said pivot connection when said second nut is rotated in a direction which moves it toward said pivot connection.

4. An accessory headlamp arrangement comprising:
   (a) an accessory headlamp,
   (b) an elongate mounting element having a body and a threaded stem at one end of said body,
   (c) an abutment between said threaded stem and the body of said mounting element, said abutment being of larger diameter than the diameter of said stem,
   (d) a pivot connection between said headlamp and the end of said mounting element opposite said stem for permitting infinite variation of the inclination of said headlamp beam,
   (e) a threaded fastener mounted on said stem, said fastener when tightened clamping a portion of a vehicle body between itself and said abutment after the azimuthal direction of said headlamp beam has been adjusted, and
   (f) locking means carried by and movable lengthwise of said mounting element body, independently of said threaded fastener, for locking said pivot connection in any selected one of an infinite number of positions of inclination of said headlamp, said locking means including a thrust collar surrounding said mounting element body, and a thrust device associated with said body for urging said thrust collar into tight frictional engagement with said pivot connection, said thrust device comprising cam means operable upon relative rotation between said thrust collar and thrust device, about the longitudinal axis of said mounting element, for pressing said collar against said pivot connection, whereby the inclination of said headlamp beam can be adjusted without releasing the threaded fastener and hence without disturbing the azimuthal adjustment of said headlamp.

5. An accessory headlamp arrangement as defined in claim 4 wherein said thrust device and thrust collar have cooperating cam surfaces.

* * * * *